Feb. 19, 1952 W. P. CZEROPSKI, JR., ET AL 2,586,521

TELEVISION RECEIVER IMAGE-SIZE CONTROL SWITCH

Filed June 16, 1950

WALTER P. CZEROPSKI JR.
RICHARD O. GRAY.
*INVENTORS.*

BY Francis W. Crotty

THEIR ATTORNEY

Patented Feb. 19, 1952 2,586,521

UNITED STATES PATENT OFFICE 2,586,521

TELEVISION RECEIVER IMAGE-SIZE CONTROL SWITCH

Walter P. Czeropski, Jr., Chicago, and Richard O. Gray, Broadview, Ill., assignors to Zenith Radio Corporation, a corporation of Illinois Application June 16, 1950, Serial No. 168,544

4 Claims. (Cl. 315—27)

This invention relates broadly to television receivers and the like, and more particularly to an improved deflection network for the image-reproducing device of such a receiver, which includes a switching circuit for altering at least one dimension of a reproduced image.

Present-day television receivers are often equipped with a control switch for altering the size of the image reproduced on the screen of the image-reproducing device. The purpose of this switch is to enable an operator to magnify the center or any other selected portion of the image at will and to simulate a close-up view thereof. In most instances, the switch is included in the field-deflection network of the receiver and is so connected that, in one operating position, the reproduced image has a dimension ratio corresponding to the standard aspect ratio of 4:3; but, in a second position, the vertical dimension is increased so that the image no longer has the standard aspect ratio.

One of the problems encountered when such a switching circuit is included in the field-deflection network of a television receiver is loss in linearity and transient disturbances as the switch is moved from one position to the other. This is due to the fact that the change in the vertical dimension of the image is usually effected by switching impedances in and out of the field-deflection network, and in usual prior-art devices, each change of the control switch from one position to the other reflects an impedance change into the primary circuit of the output transformer of the field-deflection network giving rise to the above-mentioned difficulties.

The present invention provides a deflection network which includes an improved switching circuit for altering the vertical dimension of the reproduced image at will, for the reasons described above. The switching circuit is so constructed that the impedance reflected into the primary circuit of the output transformer remains substantially constant for all operating positions of the control switch, and the aforementioned limitations of prior devices are thereby precluded.

It is, accordingly, an object of this invention to provide an improved deflection network for use in a television receiver and the like, which includes a switching circuit for altering the size of the reproduced image without introducing distortions into the image or otherwise affecting the proper operation of the deflection network.

A further object of this invention is to provide an improved field-deflection network for supplying current to the deflection coils of a television receiver and which includes a control switch for altering the vertical dimension of the reproduced image between two preselected values without distorting the image or otherwise interfering with the proper operation of the deflection network.

The features of this invention which are believed to be new are set forth with particularity in the appended claims. The invention itself, however, together with further objects and advantages thereof may best be understood by reference to the following description when taken in conjunction with the accompanying drawing, in which:

Figures 1, 2:
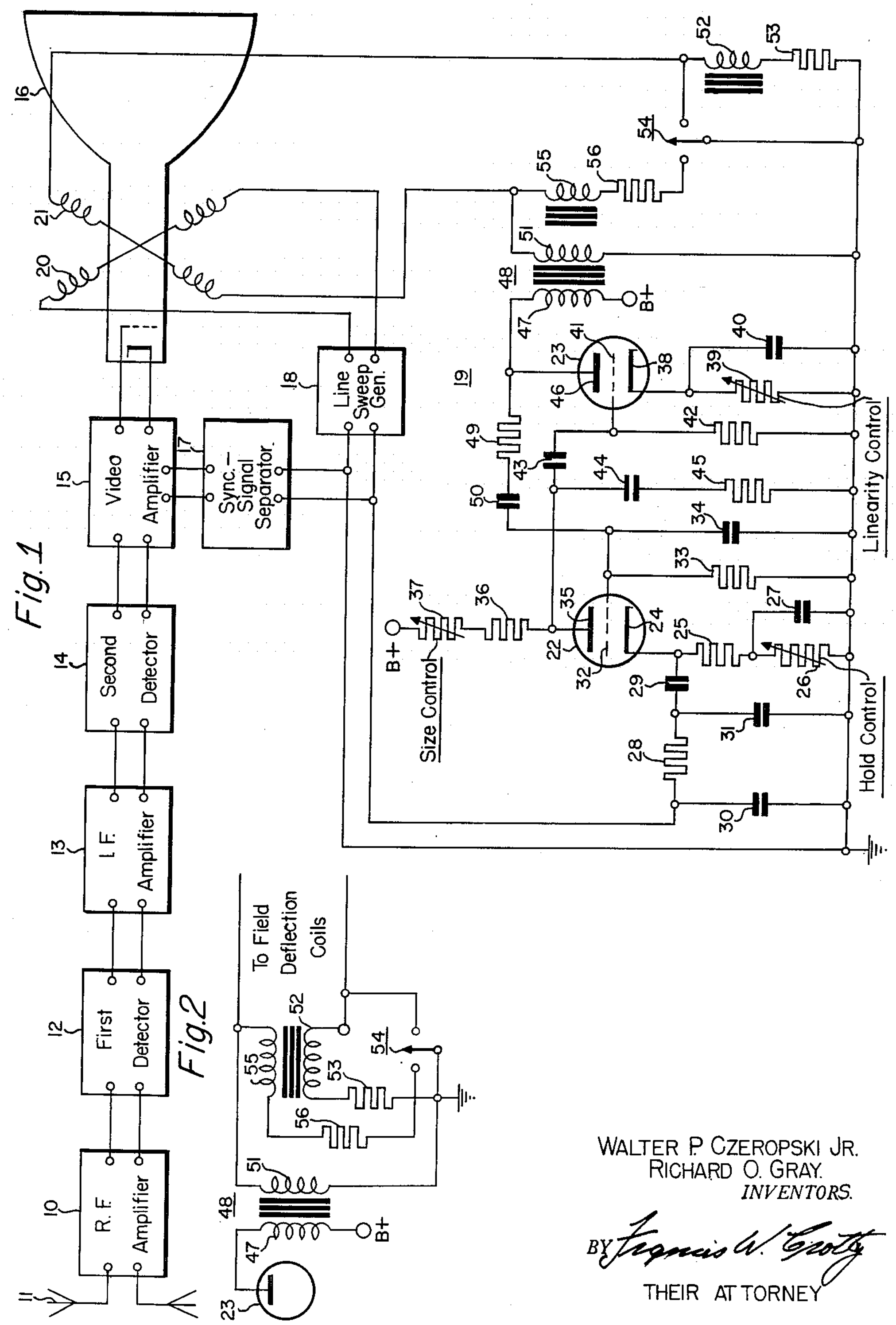
Figure 1 illustrates a television receiver incorporating the invention.
Figure 2 shows a modification of the invention.

The television receiver of Figure 1 includes a radio-frequency amplifier 10 of one or more stages having input terminals connected to an appropriate antenna circuit 11 and output terminals connected to a first detector or heterodyning stage 12. The first detector is coupled to an intermediate-frequency amplifier 13 of any desired number of stages which, in turn, is connected to a second or signal detector 14. The second detector 14 is connected to a video amplifier 15 which has output terminals coupled to the input electrodes of an image-reproducing device 16.

Video amplifier 15 is further connected to a synchronizing-signal separator 17 which, in turn, is coupled to a line-sweep generator 18 and to a field-deflection network indicated generally as 19. The output terminals of line-sweep generator 18 and deflection circuit 19 are connected respectively to line-deflection coils 20 and field-deflection coils 21 of reproducing device 16.

Television signals intercepted by antenna circuit 11 are selected and amplified in radio-frequency amplifier 10, the resulting amplified signal being supplied to first detector 12 wherein it is heterodyned to the selected intermediate frequency of the receiver. The intermediate-frequency signal from the first detector is amplified in intermediate-frequency amplifier 13 and is detected in second detector 14. A composite video signal is derived from second detector 14 and this signal is amplified in video amplifier 15 and applied to the input electrodes of device 16 to control the intensity of the cathode-ray beam therein in well-known fashion.

The synchronizing components of the composite video signal are separated from the video information in separator 17 and applied to line-sweep generator 18 and field-deflection network 19. Field- and line-deflection currents are supplied respectively to line-deflection coils 20 and field-deflection coils 21 of image-reproducing device 16 to deflect the cathode-ray beam over the screen thereof, as is well known. In this manner, reproducing device 16 acts to reproduce the image represented by a received television signal. The portion of the television receiver that utilizes the sound components of the television signal forms no part of the present invention and, for that reason, has not been shown.

The field-deflection network 19 comprises in the illustrated embodiment a pair of electron-discharge devices 22 and 23 connected to form a multivibrator circuit. Device 22 has a cathode 24 which is connected to ground through a resistor 25 series-connected with a variable resistor 26, resistor 26 being by-passed by a capacitor 27 and serving as the hold control for the network. Synchronizing-signal separator 17 is connected to cathode 24 through a resistor 28 and coupling capacitor 29, the terminals of resistor 28 being connected to ground by capacitors 30 and 31 to form a well-known integrating circuit for separating the field-synchronizing pulses from the line-synchronizing pulses. Control electrode 32 of device 22 is connected to ground through a resistor 33 shunted by a capacitor 34, and anode 35 of this device is connected to the positive terminal B+ of a source of unidirectional potential through a resistor 36 and a variable resistor 37, the latter serving as a well-known vertical size control.

Device 23 has a cathode 38 connected to ground through a variable resistor 39, resistor 39 being by-passed by a capacitor 40 and serving as a well-known vertical linearity control. Control electrode 41 of device 23 is connected to ground through a resistor 42 and is coupled to anode 35 of device 22 through a capacitor 43. A discharge capacitor 44 and series-connected peaking resistor 45 are connected between the junction of anode 35 and capacitor 43 and ground. Anode 46 of device 23 is connected to the positive terminal B+ through the primary winding 47 of an output transformer 48, and is further coupled to control electrode 32 of device 22 through a resistor 49 and a series-connected capacitor 50.

One terminal of secondary winding 51 of output transformer 48 is connected to one terminal of field-deflection coils 21 and its other terminal is connected to the other side of these coils through an inductance coil 52 which may have a resistor 53 series-connected therewith. A single-pole double-throw switch 54 has its movable arm connected to the junction of winding 51 and resistor 53, a first contact connected to the junction of coil 52 and deflection coils 21, and a second contact connected to the junction of winding 51 and deflection coils 21 through an inductance coil 55 which may have a series-connected resistor 56 associated therewith. Examination of the drawing will reveal that when the movable arm of switch 54 is in the right-hand operating position, impedance 55, 56 is disconnected from the deflection circuit and impedance 52, 53 is short circuited so that in this position deflection coils 21 are connected directly across winding 51. However, when the arm of switch 54 is in its other position, impedance 55, 56 is connected in shunt with deflection coils 21 and impedance 52, 53 is in series therewith. In accordance with the invention, impedances 55, 56 and 52, 53 are proportioned, in a manner to be described, so that operation of switch 54 causes a preselected variation in the vertical dimension of the image reproduced by device 16, yet the impedance reflected thereby into the circuit of primary winding 47 remains substantially unaltered. This precludes any disturbances of the proper synchronized operation of the multivibrator circuit or distortion of the current in coils 21, which might otherwise occur should this reflected impedance change as switch 54 is actuated from one operating position to the other.

The multivibrator circuit of devices 22 and 23 is well known, and supplies a deflection signal to the primary winding of transformer 48 of the proper wave form so that a deflection current of saw tooth waveform flows in coils 21. The waveform of the deflection signal is determined by discharge capacitor 44 and peaking resistor 45, the linearity of the resulting deflection current in coils 21 may be controlled by adjustment of linearity-control cathode resistor 39, and the magnitude of this current may be controlled by adjustment of size-control resistor 37. The frequency of the multivibrator may be controlled by varying the bias on device 22, and an initial adjustment of this bias may be effected by adjustment of hold-control resistor 26. The potential developed across integrating network 28, 30, 31 controls the bias of device 22, so that after the initial adjustment has been made, the deflection signal in winding 47 is synchronized with the field-synchronizing pulses from separator 17.

The inductance values of coils 52 and 55 and associated resistors 53 and 56 may be determined in the following manner to provide, for example, a 20% alteration in the vertical dimension of the reproduced image, and yet cause no disturbance in the impedance reflected into the circuit of primary winding 47.

When switch 54 is in a first operating position, the coils 21 are connected directly across secondary winding 51 and the following relation obtains:

$$E = IZ_1 \quad (1)$$

E: Secondary potential
I: Current through coils 21
$Z_1$: Impedance of coils 21

When switch 54 is in the second operating position, impedance 52, 53 is connected in series with coils 21 and impedance 55, 56 in shunt therewith, and for a 20% reduction in current through coils 21, the following relations obtain:

$$E = .8I(Z_1 + Z_3) \quad (2)$$

$Z_3$: Impedance of elements 52, 53

$$E = .2I(Z_2) \quad (3)$$

$Z_2$: Impedance of elements 55, 56

Solving Equations 2, 3, for $Z_2$, the following relation obtains:

$$Z_2 = 4(Z_1 + Z_3) \quad (4)$$

For equal reflected impedance, the impedance of the network for the first position of switch 54 must equal the impedance for the second position thereof, i. e.

$$Z_1 = \frac{(Z_1 + Z_3)Z_3}{Z_1 + Z_2 + Z_3} \quad (5)$$

Solving Equations 4, 5

$$Z_3 = \tfrac{1}{4}Z_1 \quad (6)$$
$$Z_2 = 5Z_1 \quad (7)$$

Therefore, to provide a 20% reduction in the vertical dimension of the reproduced image and yet cause no alteration in the reflected impedance, the inductance of coil 55 is made five times the inductance of coils 21 and the resistance of resistor 56 (including the self-resistance of coil 55) is made five times the self-resistance of coils 21. In addition, the inductance of coil 52 is made one quarter that of coils 21, and the resistance of resistance 53 (including the self-resistance of coil 52) is made one quarter that of the coils 21.

It is evident that the network may be constructed to provide other desired alterations in picture size. Moreover, switching device 54 may be constructed with multiple contacts to switch a plurality of networks selectively into both deflection circuits of the receiver to provide a plurality of preselected image sizes by controlling the vertical dimension, horizontal dimension, or both.

The embodiment of the invention shown in Figure 2 is similar in most respects to that of Figure 1, and like numerals have been utilized to designate like components. In this embodiment, coils 52 and 55 are inductively coupled as shown which leads to a more convenient and economical construction of the network in that coils 52 and 55 may be mounted on a common coil form. Moreover, it has been found that the inductive values of these coils may be materially reduced when they are mounted to have mutual inductance.

This invention provides, therefore, a field-deflection network for a television receiver or the like, including a control switch for varying the size of a reproduced image between at least two preselected values and which may be actuated from one position to the other without affecting the proper operation of the deflection network or introducing distortions into the deflection current.

While particular embodiments of the invention have been shown and described, modifications may be made and it is intended in the appended claims to cover all such modifications as may fall within the true spirit and scope of the invention.

We claim:

1. A circuit for supplying a beam-deflection current to scanning coils associated with a cathode-ray tube comprising: an output transformer having a primary winding and having a secondary winding coupled to said scanning coils; a net work coupled to said primary winding for supplying a deflection signal thereto; a first impedance and a second impedance; and a switching device for connecting said first impedance in series and said second impedance in shunt with said scanning coils and secondary winding in one operating position to reduce the size of an image reproduced by said tube, and for disconnecting said impedances from said circuit in a second operating position; said first and second impedances and the impedance value of said scanning coils being so proportioned that the reflected impedance in said primary winding remains substantially constant for both operating conditions of said switching device.

2. A circuit for supplying a beam-deflection current to scanning coils associated with a cathode-ray tube comprising: an output transformer having a primary winding and having a secondary winding coupled to said scanning coils; a network coupled to said primary winding for supplying a deflection signal thereto: a first impedance series-connected in circuit with said secondary winding and said scanning coils; a second impedance; and a switching device for connecting said second impedance in shunt with said scanning coils in one operating position to reduce the size of an image reproduced by said tube, and for disconnecting said second impedance from said circuit and for simultaneously short-circuiting said first impedance in a second operating position; said first and second impedances and the impedance value of said scanning coils being so proportioned that the reflected impedance in said primary winding remains substantially constant for both operating conditions of said switching device.

3. A circuit for supplying a beam-deflection current to scanning coils associated with a cathode-ray tube comprising: an output transformer having a primary winding and having a secondary winding coupled to said scanning coils; a network coupled to said primary winding for supplying a deflection signal thereto; a first impedance series-connected in circuit with said secondary winding and said scanning coils; a second impedance inductively coupled to said first impedance; and a switching device for connecting said second impedance in shunt with said scanning coils in one operating position to decrease the size of an image reproduced by said tube, and for disconnecting said second impedance from said circuit and for simultaneously short circuiting said first impedance in a second operating position; said first and second impedances and the mutual inductance therebetween, and the impedance value of said scanning coils being so proportioned that the reflected impedance in said primary winding remains substantially constant for both operating positions of said switching device.

4. A circuit for supplying a beam-deflection current to scanning coils having an impedance value $Z_1$ associated with a cathode-ray tube comprising: an output transformer having a primary winding and having a secondary winding coupled to said scanning coils; a first impedance having an impedance value $Z_3$ series-connected in circuit with said secondary winding and said scanning coils; a second impedance having a value $Z_2$; and a switching device for connecting said second impedance in shunt with said scanning coils in one operating position to reduce the size of an image reproduced by said tube, and for disconnecting said second impedance from said circuit and for simultaneously short-circuiting said first impedance in a second operating position; said impedance values being so chosen that:

$$Z_1=\frac{(Z_1+Z_3)Z_3}{Z_1+Z_2+Z_3}$$

WALTER P. CZEROPSKI, Jr.
RICHARD O. GRAY.

REFERENCES CITED

The following references are of record in the file of this patent:

UNITED STATES PATENTS

| Number | Name | Date |
|---|---|---|
| 2,098,390 | Iams | Nov. 9, 1937 |
| 2,168,566 | Goldsmith | Aug. 8, 1939 |
| 2,383,822 | Schlesinger | Aug. 28, 1945 |
| 2,414,939 | Fitch | Jan. 28, 1947 |
| 2,436,447 | Packard | Feb. 24, 1948 |
| 2,438,359 | Clapp | Mar. 23, 1948 |
| 2,440,786 | Schade | May 4, 1948 |
| 2,443,030 | Foster | June 8, 1948 |
| 2,449,969 | Wright | Sept. 28, 1948 |
| 2,470,197 | Torsch | May 17, 1949 |
| 2,510,670 | Trott | June 6, 1950 |
| 2,523,108 | Friend | Sept. 19, 1950 |
| 2,536,838 | Clark | Jan. 2, 1951 |
| 2,536,839 | Clark et al. | Jan. 2, 1951 |
| 2,536,857 | Schade | Jan. 2, 1951 |
| 2,543,305 | Schwartz | Feb. 27, 1951 |
| 2,543,719 | Clark | Feb. 27, 1951 |
| 2,553,360 | Court | May 15, 1951 |
| 2,555,828 | Barco | June 5, 1951 |
| 2,555,829 | Barco | June 5, 1951 |
| 2,555,832 | Denton | June 5, 1951 |